(12) United States Patent
Hashimoto et al.

(10) Patent No.: US 8,815,369 B2
(45) Date of Patent: Aug. 26, 2014

(54) ADHERING JIG FOR ADHESIVE CONNECTING MEMBER

(75) Inventors: Nobuhiro Hashimoto, Shizuoka (JP); Makoto Gotou, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 375 days.

(21) Appl. No.: 13/126,426

(22) PCT Filed: Oct. 27, 2009

(86) PCT No.: PCT/JP2009/005660
§ 371 (c)(1),
(2), (4) Date: Apr. 27, 2011

(87) PCT Pub. No.: WO2010/050183
PCT Pub. Date: May 6, 2010

(65) Prior Publication Data
US 2011/0198035 A1   Aug. 18, 2011

(30) Foreign Application Priority Data

Oct. 28, 2008   (JP) .................. 2008-277168

(51) Int. Cl.
| *B32B 3/10* | (2006.01) |
| *B29C 65/00* | (2006.01) |
| *B65H 69/02* | (2006.01) |
| *B31F 5/00* | (2006.01) |
| *G03D 15/04* | (2006.01) |
| *B32B 37/00* | (2006.01) |
| *B29C 65/78* | (2006.01) |
| *B65H 29/00* | (2006.01) |
| *B23Q 3/00* | (2006.01) |

(52) U.S. Cl.
USPC ........ 428/138; 156/304.2; 156/298; 156/158; 156/503; 156/556; 156/423; 269/303; 269/315

(58) Field of Classification Search
CPC ............ B29C 66/5221; B29C 66/1142; B29C 66/534; B29C 66/5342; B29C 66/53421; B29C 66/5346; B29C 66/53465; B29L 2023/00; B29L 2011/00; B29L 2011/0075
USPC ............... 156/91, 92, 99, 106, 157, 158, 166, 156/230, 235, 239, 247, 297, 298, 299, 156/304.1, 304.2, 304.3, 307.1, 307.7, 423, 156/502, 503, 505, 538, 539, 540, 541, 543, 156/556, 559; 428/138; 269/287, 289 R, 269/303, 315
See application file for complete search history.

(56) References Cited

U.S. PATENT DOCUMENTS 3,989,338 A * 11/1976 Gosser .............................. 439/43
5,392,368 A *  2/1995 Schiltz ............................. 385/14
(Continued)

FOREIGN PATENT DOCUMENTS

| JP | 03-175406 | 7/1991 |
| JP | 2676705 A | 7/1991 |

(Continued)

*Primary Examiner* — Philip Tucker
*Assistant Examiner* — Brian R Slawski
(74) *Attorney, Agent, or Firm* — Arent Fox LLP

(57) ABSTRACT

An adhering jig for an adhesive connecting member is provided, in which the adhesive connecting member can be adhered without being broken even if it is twisted during connection of an optical fiber. The adhesive connecting member of the present invention has a tabular member having insertion holes fitting a shape of the optical connector, and an adhesive connecting member having a certain size. The adhesive connecting member has a strongly adhesive layer and non-adhesive layer, and the adhesive connecting member was arranged at a bottom of the insertion hole via the weakly adhesive layer, so that the non-adhesive layer is lower.

7 Claims, 5 Drawing Sheets

(56) References Cited

U.S. PATENT DOCUMENTS

2007/0280617 A1 12/2007 Matsunaga et al.
2008/0099150 A1 5/2008 Hashimoto et al.

FOREIGN PATENT DOCUMENTS

| JP | 2007-297177 A | 11/2007 |
|----|---------------|---------|
| JP | 2008-216917 A | 9/2008  |

* cited by examiner

ADHERING JIG FOR ADHESIVE CONNECTING MEMBER

CROSS-REFERENCE TO RELATED APPLICATION

This application is a National Stage entry of International Application No. PCT/JP2009/005660, filed Oct. 27, 2009, which claims priority to Japanese Application No. 2008-277168, filed Oct. 28, 2008 the entire specification claims and drawings of which are incorporated herewith by reference.

TECHNICAL FIELD

The present invention relates to an adhering jig for an adhesive connecting member in an optical connection.

BACKGROUND ART

An adhesive connecting member has been conventionally known which reduces loss in an optical connection.

Furthermore, a technique of using an adhering jig in which the adhesive connecting member can be easily adhered on a tip of an optical fiber even in the field is disclosed (See Patent Document 1).

In the technique, the adhesive connecting member has a two-layer structure, each layer having strong adhesion and weak adhesion. The layer having weak adhesion adheres onto a hole bottom before use, and when an optical connector is inserted into the hole, the layer having strong adhesion strongly adheres onto the tip of the connector, and the connector can be released from the hole bottom.

However, in the case in which the adhering jig is used in a polarization maintaining optical fiber (PANDA) attracting attention recently, the adhesive connecting member might be broken since it is twisted when connecting of the optical fiber.
Patent Document 1: Japanese Unexamined Patent Application Publication No. 2008-216917

DISCLOSURE OF INVENTION

The present invention was completed in view of above circumstances, and an object of the invention is to provide the adhering jig for an adhesive connecting member that can adhere the adhesive connecting member without being broken even if it is twisted when connecting an optical fiber.

The present invention can solve the above problems by the following technical construction.

(1) An adhering jig for adhesive connecting member having a tabular member having insertion holes fitting a shape of an optical connector, and an adhesive connecting member having a certain size and consisting of a strongly adhesive layer and a non-adhesive layer, wherein the adhesive connecting member is arranged at a bottom of the insertion hole via a weakly adhesive layer, so that the non-adhesive layer is lower.

(2) An adhering jig for adhesive connecting member having a tabular member having insertion holes fitting a shape of an optical connector, and an adhesive connecting member having a certain size and consisting of a strongly adhesive layer and a non-adhesive layer, wherein the adhesive connecting member is arranged at a bottom of the insertion hole via a weakly adhesive layer and a film, so that the non-adhesive layer is lower.

(3) An adhering jig for adhesive connecting member according to above (1) or (2), wherein the non-adhesive layer is a refractive index matching resin.

(4) An adhering jig for adhesive connecting member according to above (2), wherein the film is polyethylene terephthalate film.

(5) An adhering jig for adhesive connecting member according to above (1) or (2), wherein the insertion hole is covered with a protective tape.

By the present invention, the adhering jig for adhesive connecting member in which the adhesive connecting member can be adhered without being broken even if it is twisted when connecting to the optical fiber, can be provided.

EXPLANATION OF REFERENCE NUMERALS

Figure 1A:
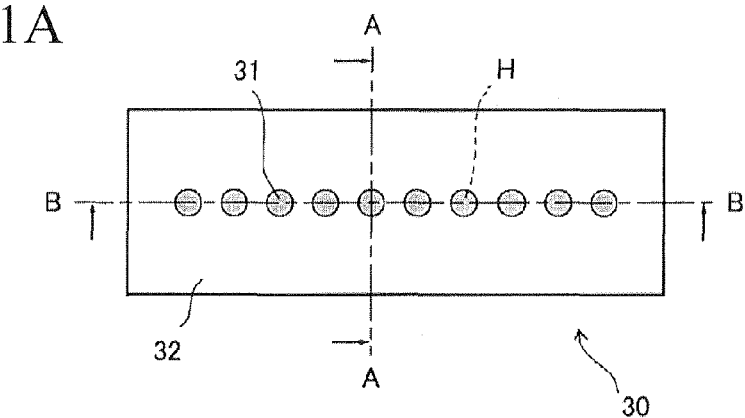
FIG. 1 is a diagram showing the adhering jig for adhesive connecting member, 1A is a plane view, and 1B is a cross sectional view seen from line B-B, and 1C is an oblique view.

30: Tabular member of Embodiment I
31: Adhesive connecting member
31a: Strongly adhesive layer
31c: Non-adhesive layer
32: Plate having holes
33: Base plate
35: Adhesive layer
36: Film
34: Protective tape
34a: Strap part of the protective tape
40: Tabular member of Embodiment II
50: Optical connector
H: Insertion hole
S: Weakly adhesive layer

EMBODIMENT OF THE INVENTION

Embodiments of the invention will be explained in detail with reference to the drawings.

Embodiment 1

First, Embodiment 1 is explained with reference to FIGS. 1 to 3.

Figure 1B:
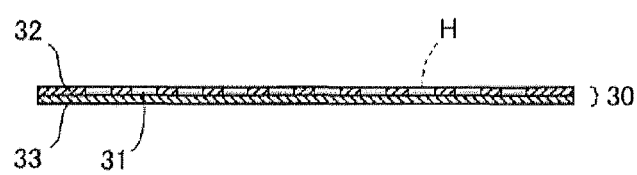
Figure 1C:
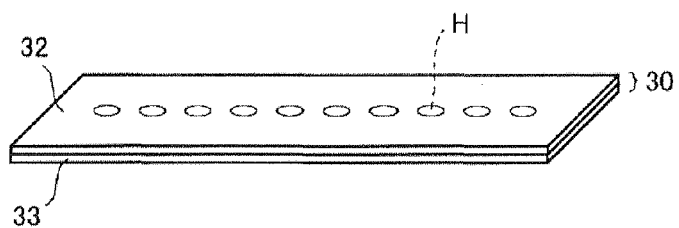
Figure 2:
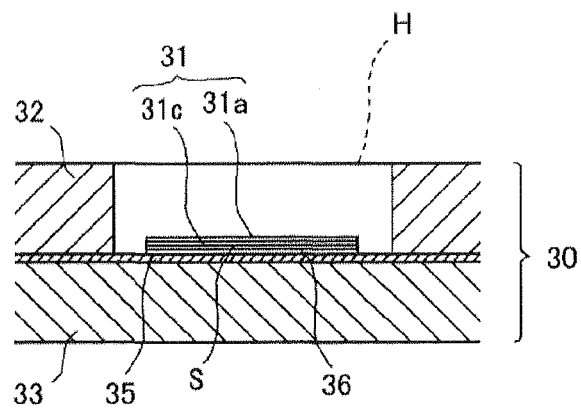
FIG. 2 is a magnified cross sectional view seen from line A-A.
Figure 3:
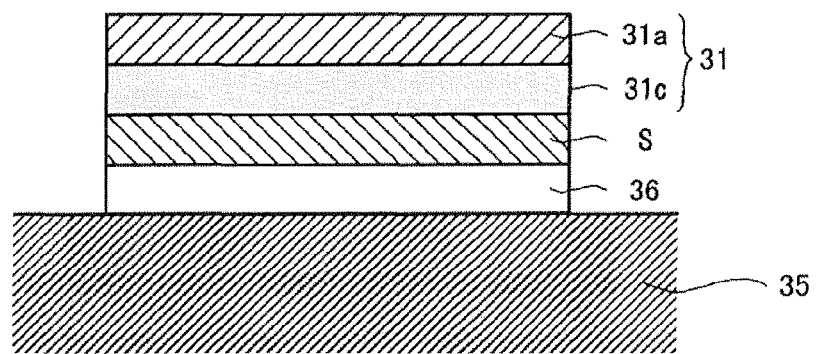
FIG. 3 is a magnified view of the adhesive connecting member.

FIG. 1 is a diagram showing the adhering jig for adhesive connecting member, 1A is a plane view, and 1B is a cross sectional view seen from line B-B, and 1C is an oblique view, FIG. 2 is a magnified cross sectional view seen from line A-A, FIG. 3 is a magnified view of the adhesive connecting member of FIG. 2.

Reference numeral 30 is a tabular member of Embodiment I, 31 is an adhesive connecting member, 31a is a strongly adhesive layer, 31*c* is a non-adhesive layer such as a refractive index matching resin, 32 is a plate having holes, 33 is a base plate, 35 is an adhesive layer, 36 is a film such as polyethylene terephthalate (PET film), H is an insertion hole, and S is a weakly adhesive layer such as a silicone adhesive.

The adhering jig for adhesive connecting member of Embodiment I is characterized in that it has the tabular member 30 having insertion holes H fitting a shape of an optical connector and the adhesive connecting member 31 cut to a certain size as shown in FIGS. 1 and 2, and that the adhesive connecting member 31 has the strongly adhesive layer 31*a* and the non-adhesive layer 31*c* and is arranged at the bottom of insertion holes H via the weakly adhesive layer S and the film 36, with the non-adhesive layer being lower, as shown in FIG. 3.

That is, at the bottom of the insertion hole H, the film 36, the weakly adhesive layer S, the non-adhesive layer 31*c*, and the strongly adhesive layer 31*a* are layered.

It should be noted that the film 36 is not an essential construction; however, it is desirable to arrange it since the weakly adhesive layer S can be maintained flat to prevent adhesive from remaining on the non-adhesive layer 31*c*.

Adhesive Connecting Member

It is necessary that the adhesive connecting member 31 used in the invention have consistent refractive index, and that one surface thereof have adhesive property (strongly adhesive layer 31*a*) and the other surface thereof have non-adhesive property (non-adhesive layer 31*c*).

By this construction, during connecting of a polarization maintaining optical fiber (PANDA) via the adhesive connecting member 31, even if the fiber is twisted so as to match its direction, the polarization maintaining optical fiber (PANDA) slides well because of the existence of the non-adhesive layer 31*c*, so as not to break the adhesive connecting member 31.

On the other hand, because of the non-adhesive property at one surface, the adhesive connecting member 31 cannot adhere weakly to the bottom of insertion hole H before use of the adhering jig for the adhesive connecting member; however, this problem can be solved by arranging it via the weakly adhesive layer S and the film 36.

The non-adhesive layer 31*c* is a non-adhesive material having a refractive index matching property, and it is desirable to use a refractive index matching resin having high strength or the like. The refractive index is desirably in a range from 1.35 to 1.55.

It should be noted that the strongly adhesive layer 31*a* and the non-adhesive layer 31*c* can be unified, or another refractive index matching material can be arranged between the strongly adhesive layer 31*a* and the non-adhesive layer 31*c*.

As the strongly adhesive layer 31*a*, kinds of adhesive agent of such as a polymer material, such as of the acrylic type, epoxy type, vinyl type, silicone type, rubber type, urethane type, methacryl type, nylon type, bis-phenol type, diol type, polyimide type, fluoride epoxy type, fluoride acrylic type or the like can be used. In addition, these can be mixed, or a fluorine resin or a hardening agent can be added, if necessary.

In particular, from the viewpoint of adhesive property or other viewpoint, acrylic type adhesive and silicone type adhesive are desirably used.

The strongly adhesive layer 31*a* is required to have strong adhering force so that the adhesive connecting member 31 and the optical connector do not separate, the force is desirably not less than 100 gf/25 mm, more desirably not less than 1000 gf/25 mm, and particularly desirably not less than 1500 gf/25 mm.

It should be noted that the adhering force is a measured value being compliant with the adhering force of separating at 180 degrees in JIS (Japanese Industrial Standard) Z 0237 (hereinafter similarly). It is desirable that the refractive index be in a range of 1.35 to 1.55.

It is desirable that the thickness of the adhesive connecting member 31 be in a range of 10 to 40 μm in the sum of the strongly adhesive layer 31*a* and the non-adhesive layer 31*c*. Furthermore, it is desirable that the thickness of the non-adhesive layer 31*c* be not more than 9 μm, and more desirably not more than 5 μm.

It is desirable that the size of the adhesive connecting member 31 be slightly narrower than the insertion holes H fitting with shape of the optical connector, and that it is arranged at a center of the insertion hole H.

The refractive index matching property of the adhesive connecting member 31 means an approximation between the refractive index of the adhesive connecting member and the refractive index of the optical transmitting medium and/or an optical part connected.

The refractive index of the adhesive connecting member used in the invention is not limited in particular as long as it is close to the refractive index of the optical transmitting medium and/or the optical part. However, from the viewpoint of transmission loss by avoidance of Fresnel reflection, it is desirable that the difference between the refractive indexes is within ±0.1, more desirably within ±0.05. It should be noted that in the case in which the difference of the optical transmitting medium and the optical part is large, it is desirable that the average value of the refractive indexes of the optical transmitting medium and the optical part, and the refractive index of the adhesive connecting member, be within the above range.

Intermediating Medium

It is necessary that the adhering jig for adhesive connecting member have an intermediating medium holding the adhesive connecting member 31.

In practice, it is the weakly adhesive layer S and film 36.

The weakly adhesive layer S holds the adhesive connecting member 31 before use by adhering weakly with the non-adhesive layer 31*c*, and it is necessary that the weakly adhesive layer S be separated from the non-adhesive layer 31*c* when the optical connector is inserted.

As the weakly adhesive layer S, kinds of adhesive agent of such as a polymer material, such as of the acrylic type, epoxy type, vinyl type, silicone type, rubber type, urethane type, methacryl type, nylon type, bis-phenol type, diol type, polyimide type, fluoride epoxy type, fluoride acrylic type or the like can be used. In addition, these can be mixed, or a fluorine resin or a hardening agent can be added, if necessary.

In particular, from the viewpoint of adhesive property and a property of leaving adhesive residue, a silicone type adhesive is desirably used.

Adhesive force of the weakly adhesive layer S is desirably in a range of 1 to 100 gf/25 mm, more desirably in a range of 5 to 50 gf/25 mm, and particularly desirably in a range of 5 to 30 gf/25 mm.

The adhesive connecting member 31 may be separated before use in the case in which the adhesive force of the weakly adhesive layer S is less than 1 gf/25 mm, and the adhesive residue may remain in the case in which the adhesive force is greater than 100 gf/25 mm.

It is necessary that the film 36 weakly adhere with the weakly adhesive layer S, and that it hold the weakly adhesive layer S when the optical connector is inserted.

Therefore, in a relationship with the weakly adhesive layer S, it is necessary to use material having more compatibility from the viewpoint of adhesion than the non-adhesive layer 31c.

As such a material, PET film or the like is desirably used.

It is desirable that the thickness of the film 36 be in a range of 10 to 70 μm.

Tabular Member

One piece of a member can be used as the tabular member of the present invention; however, it is desirable that plate having holes 32 and base plate 33 be unified by adhesive layer 35, as shown in FIG. 2.

By this construction, depth of the insertion hole H can be controlled by thickness of the plate having holes 32. Furthermore, it is not easy for holes to be formed on the one piece member and the adhesive connecting members 31 to be arranged at the bottoms of the holes; however, by the above construction, the adhesive connecting members 31 can be easily arranged at the bottoms of the holes by arranging the adhesive connecting members 31 on the adhesive layer 35 and then placing the plate having holes 32 thereon.

The insertion hole H has a size fitting with a shape of the optical connector; however, the size can be slightly larger.

Depth of the insertion hole H, that is, thickness of the plate having holes in FIG. 2, is desirably a depth fitting to the optical connector inserted, in particular, the range of about 0.1 mm to 10 mm is desirable.

As the plate having holes 32, an acrylic plate or the like in which holes are formed accurately by laser is desirably used.

It is desirable that the insertion holes H be arranged regularly. Ten circular holes in one line are shown in FIG. 1; however, the number of holes in one line or the number of lines can be increased, or insertion holes each having different diameter (or width) and shape so as to correspond to plural kinds of optical connector, can be arranged.

As the optical connector used as the adhering jig for adhesive connecting member of the present invention, an SC connector, FC connector, MPO connector, MT connector, MU connector, FPC connector or the like can be mentioned.

For example, a circular hole for an SC connector and a square hole for an MT connector can be formed on one tabular member.

As the base plate 33, PET (polyethylene terephthalate) or the like can be desirably used.

Thickness of the base plate 33 is not limited in particular; however, the thickness is desirably in a range of 50 to 5000 μm.

It is desirable that the adhesive layer 35 have flexibility so that the optical connector is pressed against it, and double-faced tape or the like is desirably used.

Thickness of the adhesive layer 35 is desirably in the range of 100 to 200 μm.

Embodiment II

Figure 4A:
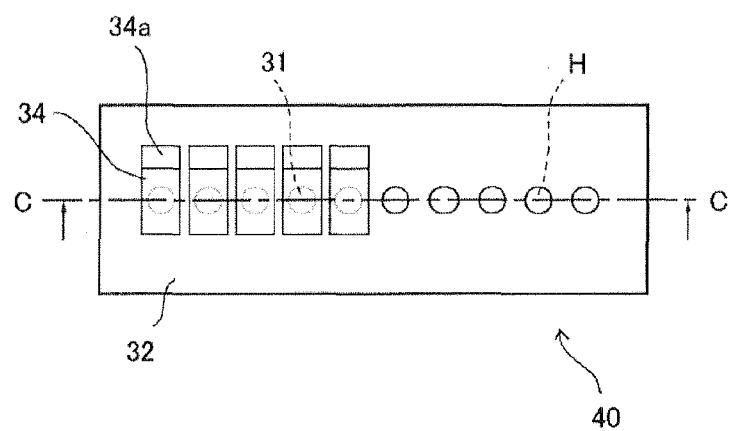
FIG. 4 is a diagram showing the adhering jig for adhesive connecting member of Embodiment II, 4A is a plane view, and 4B is a cross sectional view seen from line C-C, and 4C is an oblique view.
Figure 4B:
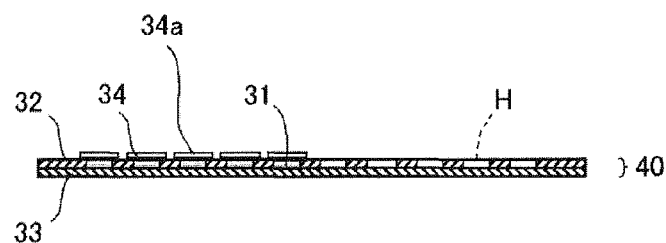
Figure 4C:
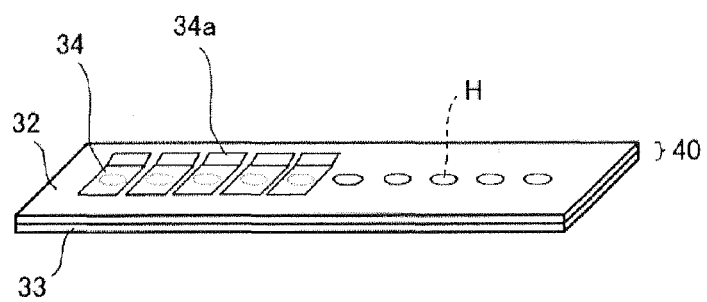

Next, Embodiment II is explained by way of FIG. 4.

FIG. 4 is a diagram showing the adhering jig for an adhesive connecting member of Embodiment II, 4A is a plane view, and 4B is a cross sectional view seen from line C-C, and 4C is an oblique view.

Reference numeral 34 is a protective tape, 34a is a strap part of the protective tape, and 40 is a tabular member of Embodiment II.

The adhering jig for adhesive connecting member of Embodiment II is the same as that of Embodiment I, except that the insertion holes H are covered with the protective tape 34.

As the protective tape 34, commercially available mending tape or the like can be desirably used.

By the protective tape 34, dust or the like is prevented from entering in the insertion holes H before use.

In addition, as shown in FIG. 4, if the protective tape 34 is separated and removed when using, whether an insertion hole is already used or not can be obvious by the existence of the protective tape.

It should be noted that by forming the strap part 34 by bending an edge part of the mending tape, handling is easier and workability is improved.

Process for Production of Adhering Jig for Adhesive Connecting Member

Next, a process for production of an adhering jig for adhesive connecting member of the invention is explained.

First, the strongly adhesive layer 31a of polymer material or the like is coated in a sheet shape, it is joined with the non-adhesive layer 31c such as refractive index matching resin, to prepare the adhesive connecting member 31

On the other hand, the weakly adhesive layer S such as silicone type adhesive agent is coated in a sheet shape on the film 36 such as PET film or the like, to prepare the intermediating medium.

The adhesive connecting member 31 and the intermediating medium are joined to prepare a four-layered body.

At this time, the order of the four-layered body is: film 36, weakly adhesive layer S, non-adhesive layer 31c, and strong adhesive layer 31a.

Next, the adhesive layer 35 such as a double-faced tape or the like is adhered on the base plate 33, and the four-layered body is placed thereon.

Subsequently, except for predetermined parts that correspond to insertion holes, the other part of the four-layered body is cut off.

By placing the plate having holes 32 in which holes has been accurately formed beforehand by laser or the like, on the double-faced tape 35, to prepare the adhering jig for adhesive connecting member of Embodiment I.

Furthermore, by adhering the protective tape 34 over the insertion holes H, the adhering jig for adhesive connecting member of Embodiment II is prepared.

It should be noted that a protective sheet for protecting each layer from dust can be freely used in the above process for production.

Process for Use of Adhering Jig for Adhesive Connecting Member

Figure 5A:
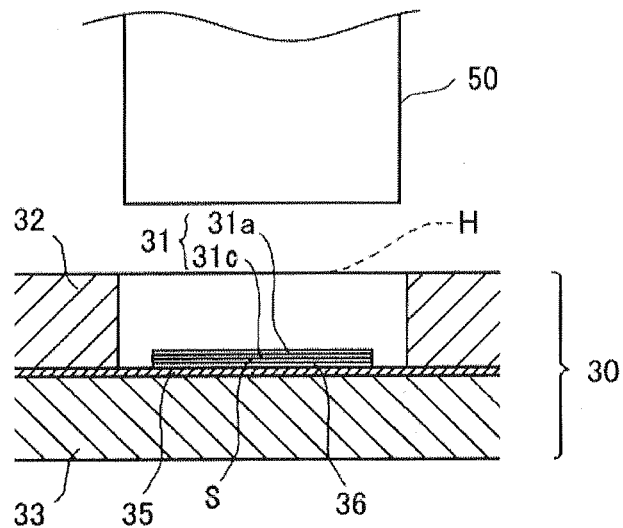
FIG. 5 is a magnified cross sectional view seen from line A-A showing a method to use the adhering jig for adhesive connecting member, 5A is a diagram before inserting optical connector, 5B is a diagram during inserting of optical connector, and 5C is a diagram after inserting optical connector.
Figure 5B:
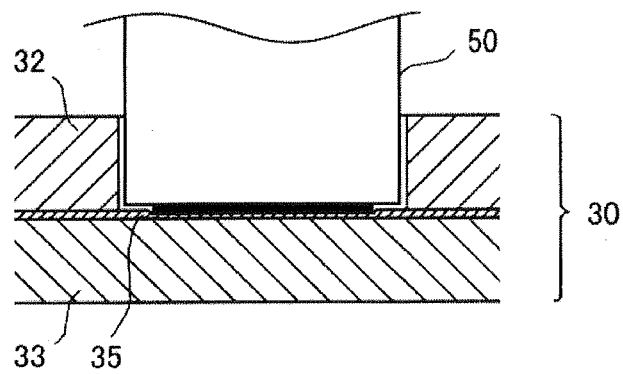
Figure 5C:
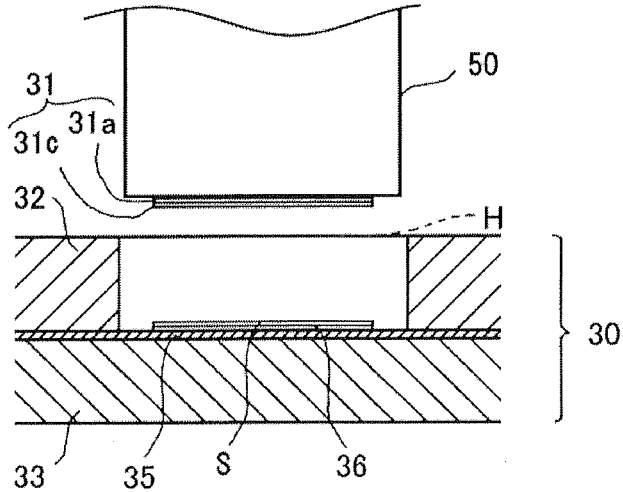
Figure 6:
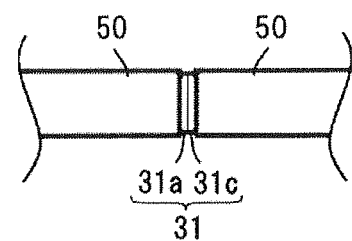
FIG. 6 is a side view showing a concept of an optical connecting structure in which the adhesive connecting member is used.

Next, process for use of adhering jig for adhesive connecting member of the invention is explained by way of FIGS. 5 and 6.

FIG. 5 is a magnified cross sectional view seen from line A-A showing a method to use the adhering jig for adhesive connecting member, 5A is a diagram before inserting an optical connector, 5B is a diagram during inserting of an optical connector, and 5C is a diagram after inserting an optical connector. FIG. 6 is a side view showing a concept of an optical connecting structure in which the adhesive connecting member is used.

Reference numeral 50 is an optical connector.

As shown in FIG. 5A of the adhering jig for adhesive connecting member before inserting the optical connector 50, the adhesive connecting member 31 is arranged on the bottom of the insertion hole H via the film 36 and the weakly adhesive layer S.

As shown in FIG. 5B, during inserting of the optical connector 50, the strongly adhesive layer 31a contacts and adheres to the optical connector 50, and since the adhesion layer 35 functions as a cushion due to its further flexibility, all over the surface of the adhesive connecting member 31 adheres to a tip of the optical connector 50.

As shown in FIG. 5C, after inserting the optical connector 50, the non-adhesive layer 31c separates from the weakly adhesive layer S, and the adhesive connecting member 31 transfers to a tip of the optical connector 50.

Thus, as shown in FIG. 6, an optical connecting structure can be completed easily by pressing the optical connector 50 against another optical connector.

At this time, since the non-adhesive layer 31c and the optical connector 50 do not adhere to each other, even if the optical connector 50 is twisted, the adhesive connecting member 31 would not be broken because of good sliding due to existence of the non-adhesive layer 31c.

Therefore, the present invention can be used in a connection process of a polarization maintaining optical fiber (PANDA).

In addition, even in the case in which the optical connectors 50 are misaligned with each other, their connection can be easily retried.

EXAMPLES

Hereinafter the present invention is further explained by way of Examples.

Example 1

As a raw material of the strongly adhesive layer of the adhesive connecting member, the following material A was prepared.
Material A:
Acrylic type adhering agent (100 parts by weight)+epoxy type hardening agent (0.05 parts by weight) (adhering force: 1767 gf/25 mm, refractive index at 20° C.: 1.463)

It should be noted that the refractive index was measured by a light source of wavelength of 1310 nm (hereinafter the same).

As a raw material of the non-adhesive layer of the adhesive connecting member, the following material X was prepared.
Material X:
Acrylic type resin (100 parts by weight) (no adhering force, refractive index at 20° C.: 1.460, Rockwell hardness M scale: 98)

As a raw material of the weakly adhesive layer of the intermediating medium, the following material S was prepared.
Material S:
Silicone adhering material (100 parts by weight)+platinum catalyst (0.004 parts by weight) (adhering force: 7.6 gf/25 mm)

As a film of the intermediating medium, PET film (produced by Teijin Du Pont, trade name: Merinex50S, thickness: 50 μm) was prepared.

First, the adhesive connecting member was produced as follows.

A separate PET film having a thickness of 50 μm (PET film on which separating agent was coated, produced by Lintech, trade name: PET5001) was placed, and the material A was coated thereon so as to have thickness of 15 μm.

Then, the material X having a thickness of 5 μm was placed thereon to join them, so that the adhesive connecting member was prepared.

Next, the intermediating medium was produced as follows.
A PET film having thickness of 50 μm (produced by Teijin Du Pont, trade name: Merinex50S) was placed, and the material S was coated thereon so as to have thickness of 15 μm, so that the intermediating medium was prepared.

The adhesive connecting member and the intermediating medium were joined to prepare the four-layered body.

At this time, the four layers consisted of the PET film, the weakly adhesive layer, the non-adhesive layer, and strongly adhesive layer, in this order, and the separate PET film existed thereon as a protect sheet.

Next, a double-faced tape as the adhesive layer (produced by Nitto Denko, trade name: double-faced adhesive tape, thickness: 125 μm) was adhered on a transparent PET plate as the base plate (produced by Acrysunday, trade name: Sunday PET, thickness 500 μm), and the four-layered body was placed thereon.

Next, the separate PET film, which was a protective sheet, was separated so that the strong adhesive layer was the uppermost layer.

Next, except for predetermined parts, the other part of the four-layered body was cut off.

That is, the predetermined ten parts of PET film, weakly adhesive layer, non-adhesive layer and strongly adhesive layer, which correspond to insertion holes, were cut by laser so as to have circular shape having diameter of 2 mm, the other part was separated from the double face tape to be removed.

Then, a plate having holes in which ten holes having diameter of 2.5 mm were beforehand formed accurately by laser at predetermined ten positions (produced by Acrysunday, trade name: Acrylsunday plate, thickness: 1 mm), was aligned and placed on the double-faced tape.

Furthermore, a mending tape, which was a protective tape (produced by Sumitomo 3M, trade name: Scotch mending tape), was adhered so as to cover over the insertion holes H, to prepare the adhering jig for adhesive connecting member of Example 1.

Example 2

The intermediating medium was prepared only using the weakly adhesive layer.

Except for this, the adhering jig for adhesive connecting member of Example 2 was produced in a manner similar to that of Example 1.

Comparative Example 1

The intermediating medium was prepared only using the PET film.

Except for this, the adhering jig for adhesive connecting member of Comparative Example 1 was produced in a manner similar to that of Example 1.

Therefore, the adhesive connecting member did not adhere with the adhering jig for adhesive connecting member, and the member was simply placed on the jig.

Comparative Example 2

The weakly adhesive layer was used instead of the non-adhesive layer of the adhesive connecting member.

As a raw material of the weakly adhesive layer, the following material Y was prepared.
Material Y:
Acrylic type adhering agent (100 parts by weight)+epoxy type hardening agent (4 parts by weight) (adhering force: 30 gf/25 mm, refractive index at 20° C.: 1.468)

Then, the adhesive connecting member was produced as follows.

A separate PET film having a thickness of 50 μm (produced by Lintech, trade name: PET5001) was placed, and the material A was coated thereon so as to have a thickness of 15 μm.

Next, the material Y was coated thereon to have a thickness of 5 μm to produce the adhesive connecting member.

Then, as the intermediating medium, a separate PET film (Produced by Tohcello, trade name: 38-O3-BU, thickness: 38 μm) was used.

Except for this, the adhering jig for adhesive connecting member of Comparative Example 2 was produced in a manner similar to that of Example 1.

Main conditions in Examples and Comparative Examples are shown in Table 1.

TABLE 1

|  | Adhesive connecting member | Intermediating member |
| --- | --- | --- |
| Example 1 | Strongly adhesive layer + Non-adhesive layer | Weakly adhesive layer + PET film |
| Example 2 | Strongly adhesive layer + Non-adhesive layer | Weakly adhesive layer |
| Comparative Example 1 | Strongly adhesive layer + Non-adhesive layer | PET film |
| Comparative Example 2 | Strongly adhesive layer + Weakly adhesive layer | Separate PET film |

The adhering jig for adhesive connecting member of the Examples and Comparative Examples were evaluated by the following method.

Method for Evaluation (Rotation Durability of Adhesive Connecting Member)

Two FC connectors (produced by Sumitomo Denko, trade name: Pigtail fiber having FC connector on one end) were prepared.

Then, using the adhering jig for adhesive connecting member of Examples and Comparative Examples, the adhesive connecting member was adhered on the FC connector of one side.

Next, while the FC connector was pressed to the other connector using a divided sleeve, a condition of connection in which a polarization maintaining optical fiber (PANDA) was connected was simulated by rotating the FC connector twice.

After that, the two FC connectors were separated, and the adhesive connecting member was observed.

Rotation durability of the adhesive connecting member was evaluated as "durable" in the case in which no damage was observed, and it was evaluated as "nondurable" in the case in which even slight damage was observed.

(Holding of Adhesive Connecting Member Before Use)

Using the adhering jig for adhesive connecting member of the Examples and Comparative Examples, the adhesive connecting member was adhered on a FC connector (produced by Sumitomo Denko, trade name: Pigtail fiber having FC connector at one end), the condition was observed.

Holding property of the adhesive connecting member before use was evaluated as "adhered" in the case in which it could be adhered at a center of the FC connector without having slack or wrinkling, and it was evaluated as "not adhered" in the case in which it could not be adhered.

Results are shown in Table 2.

TABLE 2

|  | Rotation durability of the adhesive connecting member | Holding property of the adhesive connecting member before use |
| --- | --- | --- |
| Example 1 | Durable | Adhered |
| Example 2 | Durable | Adhered |
| Comparative Example 1 | Durable | Not Adhered |
| Comparative Example 2 | Nondurable | Adhered |

Result of Evaluation

By the present invention as explained above, there is no practical problem in Examples 1 and 2 regarding the rotation durability of the adhesive connecting member and the holding property of the adhesive connecting member before use.

On the other hand, in Comparative Example 1, there is no problem regarding the rotation durability; however, the adhesive connecting member could not reliably be adhered to a center of the FC connector, and thus there is a practical problem regarding the holding property of the adhesive connecting member.

Furthermore, in Comparative Example 2, there was no problem regarding the holding property of the adhesive connecting member; however, the rotation durability was insufficient, and the adhesive connecting member was twisted and broken, and there is therefore a practical problem.

The invention claimed is:

1. An adhering jig for an adhesive connecting member, comprising:
   a tabular member having one or more insertion holes fitting a shape of an optical connector,
   an adhesive connecting member inserted into each of the one or more holes and having a certain size, with each adhesive connecting member consisting of a first layer and a second layer, and
   an intermediating medium arranged at a bottom of each of the one or more insertion holes and having an adhesive layer on at least a side counter to the bottom,
   wherein an adhesive force of the first layer is stronger than an adhesive force of the adhesive layer, the second layer has no adhesive force, and the adhesive connecting members are arranged on the respective intermediating mediums, so that the second layer faces the adhesive layer.

2. The adhering jig for an adhesive connecting member according to claim 1, wherein the second layer is made of a resin having an approximately equal refractive index to that of an optical transmitting medium and/or an optical part connected with an optical connector.

3. The adhering jig for an adhesive connecting member according to claim 1, wherein each insertion hole is covered with a protective tape.

4. An adhering jig for an adhesive connecting member, comprising:
   a tabular member having one or more insertion holes fitting a shape of an optical connector,
   an adhesive connecting member inserted into each of the one or more holes and having a certain size, with each adhesive connecting member consisting of a first layer and a second layer, and
   an intermediating medium arranged at a bottom of each of the one or more insertion holes and having an adhesive layer on a side counter to the bottom and a film on a side facing the bottom,
   wherein an adhesive force of the first layer is stronger than an adhesive force of the adhesive layer, the second layer has no adhesive force, and the adhesive connecting members are arranged on the respective intermediating mediums, so that the second layer faces the adhesive layer.

5. The adhering jig for an adhesive connecting member according to claim 4, wherein the second layer is made of a resin having an approximately equal refractive index to that of an optical transmitting medium and/or an optical part connected with an optical connector.

6. The adhering jig for an adhesive connecting member according to claim 4, wherein the film is polyethylene terephthalate film.

7. The adhering jig for an adhesive connecting member according to claim 4, wherein each insertion hole is covered with a protective tape.

* * * * *